3,061,471
SIZING HYDROPHOBIC FIBERS WITH GRAFT COPOLYMERS OF GELATINIZED STARCH AND ACRYLATES
Charles E. Brockway, Dean W. Christman, and Reedus Ray Estes, Decatur, Ill., assignors to A. E. Staley Manufacturing Company, Decatur, Ill., a corporation of Delaware
No Drawing. Filed Mar. 2, 1960, Ser. No. 12,269
11 Claims. (Cl. 117—139.5)

This invention relates to a gelatinized starch product modified by the addition to the starch molecule of grafted polymers of the acrylic type and a method for producing the same and particularly to a composition useful in sizing hydrophobic fibers.

The term "graft" or "graft copolymer" is taken to mean the modification of an existing polymer, in this case gelatinized starch, by the addition of a different polymer at generally regular sites in the molecule of the existing polymer. It is generally agreed that a graft copolymer has a composite of the properties of the individual polymers. The existing polymer is chemically combined with the second polymer so that they are not separable by physical methods.

In the copending application of Brockway, Estes and Smith, Serial No. 799,108, filed March 10, 1959, there are disclosed graft copolymers of granular starch and a wide variety of monomers. It has now been discovered that for certain purposes it is necessary that the starch first be gelatinized before reacting the starch to form the graft copolymer. For reasons which are not entirely known to us, the properties of a graft copolymer formed with gelatinized starch are substantially different from the properties of a graft copolymer of granular starch that is treated to gelatinize it after the copolymerization although otherwise the copolymers are the same. For example, the graft copolymers of gelatinized starch are rather easily produced as stable aqueous dispersions similar to latexes of other polymers while graft copolymers of granular starch cannot easily be so dispersed.

As is well known, starch exists in two forms, the granular and the gelatinized. In the gelatinization of starch the starch is caused to swell in water until the characteristic birefringent pattern of granular starch disappears. Normally, this process of gelatinization, or, as it is sometimes called, "cooking" or "pasting," is performed by heating the starch in water to a temperature upwards of about 70 to 75° C. and usually near the boiling point, or by treating the starch with an aqueous alkali. Usually, when an aqueous alkali is used, the temperature at which the gelatinization takes place is reduced, and may be as low as room temperature. When starch is gelatinized in water, there is a rather sudden and very great increase in the viscosity of the starch-water mixture, and this effect is used to advantage in many industrial processes. Furthermore, when gelatinized, the starch remains dispersed rather uniformly in the water and the pasted-starch dispersion adheres well to a wide variety of materials. This property of starch pastes is relied upon in many processes where adhesive qualities are necessary. Starch pastes are also capable of forming cohesive films which resist abrasion to a marked degree.

These qualities of starch pastes, adhesiveness and the ability to form abrasion-resistant films, are used in the weaving of fabrics, particularly in the process of warp sizing for cotton fibers. Unfortunately, aqueous starch pastes cannot be used in sizing the modern synthetic fibers which are hydrophobic in nature. Typical of these are the polyester fibers, such as Dacron. We have now discovered that it is possible to modify starch by reacting a starch paste with an acrylate ester of an alkanol of two to four carbon atoms whereby the resulting product has greatly improved adhesion to polyester fibers and furthermore coats such fibers with a relatively abrasion-resistant film.

It is an object of this invention to provide a new modification of starch.

A specific object of the invention is to provide a modified starch particularly useful in the sizing of hydrophobic synthetic fibers and a method of preparing the same.

Additional objects of the invention will be, in part, apparent and, in part, pointed out hereinafter.

The objects of our invention are attained in a composition comprising the graft copolymer of gelatinized starch and an acrylate ester of a saturated alkanol of two to four carbon atoms in which the ratio of starch to acrylic ester lies in the range of 6:4 to 1:19. This composition is the reaction product of gelatinized starch and the acrylic ester in water in the presence of a free-radical catalyst.

In another aspect, this invention is a sizing composition for hydrophobic fibers comprising an aqueous suspension of the graft copolymer.

In a further aspect, this invention is an improvement in the process of warp sizing of hydrophobic fibers, the improvement comprising applying the aqueous suspension of the graft copolymer to the warp yarns.

Generally speaking, yarns of hydrophobic fibers are sized before weaving to increase weaving efficiency by preventing breaks and suppressing the effects of flaws in the yarns such as knots, weak spots, etc. This purpose is served by imparting to the yarns increased strength and resistance to abrasion. To do this, the sizing material must form a film that adheres to the yarn, that is sufficiently lubricating to permit the yarn to slide over the various surfaces that come in contact with it, that is elastic and flexible and preferably forms a film that is transparent. Furthermore, in most instances, the sizing material must be readily removable by normal methods of desizing. All of these requirements are met by the sizing composition of this invention.

Common practice in sizing cotton yarns is to use aqueous starch pastes for sizing. Unfortunately, however, starch pastes depend to a great extent on penetration of the yarn to obtain the necessary adherence to the film. The smooth, continuous-filament hydrophobic synthetic fibers do not permit the use of starch since the starch does not adhere sufficiently to such fibers to be useful. We have discovered that it is possible to modify starch in such manner that the product will perform as satisfactorily as starch as a size and yet will adhere well to continuous-filament yarns of hydrophobic fibers.

The word "starch" is used herein in its generic sense to refer to the various native starches (corn, potato, waxy maize, tapioca, rice, wheat, etc.), to dextrins and to the various modifications and derivatives that are available. The phrase "thin-boiling starch" is used herein to designate those starch products, whether modifications of native starch or derivatives, which, when gelatinized in water, produce pastes that are less viscous, cohesive and tacky and tend less to gel than the native starches. Such "modified" starches and starch derivatives include, for example, the hypochlorite-oxidized, the acid-modified, the ethers (e.g., hydroxyethyl and carboxymethyl ethers), the acetates, the enzyme-converted, and so on. We prefer to use the thin-boiling starches and dextrins because the viscosities imparted to the products formed with native starch are often so high at usable solids content that the products are difficult to handle. The reasons for this is that modification of the starch in accordance with this invention increases the viscosity of the resulting emulsion. Accordingly, it is desirable to use starch of the thin-boiling type. Particularly good results are obtained in the sizing compounds prepared with starch oxidized with sodium hypochlorite, for example, to a carboxyl content of the order of 0.5 to 2.0%; apparently the carboxyl groups introduced by the hypochlorite treatment aid in producing the improved results. Instead of pasting the starch just before it is reacted, we may use pre-gelatinized starch which forms a paste upon mixing with water.

The reaction is suitably performed at a temperature between 30 and 80° C. and at a pH between 3 and 7. Higher temperatures tend to hasten the reaction, but the temperature should be chosen to avoid too rapid decomposition of the catalyst. In general, the techniques and precautions applicable in free-radical emulsion polymerization are applicable in preparing the compounds of the present invention.

The catalysts that are useful in accordance with this invention are of the type that establish mildly oxidizing conditions in the reaction mixture in the concentrations used; these are usually classified as free-radical formers or are sometimes called peroxidic catalysts. This class of catalysts includes, among others, hydrogen peroxide, organic peroxides and hydroperoxides such as benzoyl peroxide and t-butyl hydroperoxides, sodium hypochlorite and persulfate salts such as potassium and ammonium persulfates. We have found that better yields are often obtained by adding an adjuvant for the oxidizing catalyst. The adjuvant is a mild reducing agent and may be, for example, ferrous ion (in the form of ferrous ammonium sulfate), sodium sulfite or metabisulfite or sodium formaldehyde sulfoxylate. The adjuvant may be added to the reaction mixture before the initiator is added or, when the initiator is added before the monomer, the addition of the activator may be delayed until the monomer has been added. The catalyst is used in the conventional amount necessary to polymerize the monomer, i.e., as if the starch were not present. This is so despite the fact that extraction studies on the product indicate that the starch reacts to form a graft copolymer.

The extent of conversion of the monomer may be controlled by the addition of a suitable stopping agent, such as hydroquinone or others well known to the art. Otherwise, the reaction may be permitted to run until substantially all of the monomer is consumed, and this is preferred.

We have found it convenient on occasion to use 0.5 to 5.0 parts of an emulsifier per hundred parts of monomer as part of the reaction medium. The emulsifier serves to reduce coagulum in the reaction product and to permit less careful control of the reaction conditions. The emulsifiers that serve for this purpose are non-cationic types, whether anionic or nonionic. Typical of the anionic type are salts of alkyl sulfates (e.g., sodium lauryl sulfate, sodium octyl sulfate, sodium tetradecyl sulfate), aromatic sulfonic acids and salts (e.g., alkyl benzene sulfonates wherein the alkyl radical contains 4 to 16 carbon atoms, alkyl naphthyl sulfonates, alkyl biphenyl sulfonates), salts of polyoxyethylene sulfate, sodium salts of alkylated succinamates and so on. Typical of the nonionic emulsifiers that we have used are alkyl-aryl ethers of polyethylene glycols (e.g., the octyl phenyl, the nonyl phenyl, the tridecyl phenyl and the dioctyl phenyl ethers), fatty acid mono-esters of polyethylene glycols, fatty amide condensation products of polyethylene glycols and so on.

Surprisingly, the acrylate-pasted starch copolymer appears to be unique in the properties useful in sizing hydrophobic fibers. Even such closely related compounds as methyl acrylate, methyl and butyl methacrylate, and acrylic and methacrylic acids each of which forms a graft copolymer with pasted starch cannot be substituted for the acrylic esters of this invention to produce the desired results. Monomers of more widely different character, such as vinyl acetate, styrene, acrylamide, etc., are similarly useless for this purpose according to our experiments. We can, however, substitute certain monomers for up to 50% of the ethyl acrylate content, for example, acrylic acid and methyl methacrylate. Generally speaking, however, such substitution offers no advantage.

We have found that useful results are obtained when the starch-to-monomer ratio is in the range of 6:4 to 1:19. This ratio appears to depend partly on the molecular weight of the starch used, and best results with any particular variety of starch (e.g. dextrin, oxidized native starch, starch ether, etc.) may be at different positions in the range.

For reasons that are not easily recognizable, it appears that, when the polymerization is carried out at a relatively high concentration of solids in water, the product is somewhat better in its sizing properties even though the emulsion formed must be diluted before it can be used as a size. However, the proportion of solids during the polymerization must be carefully regulated so that the final product is not inconveniently viscous. Based on these criteria, our preferred range of total solids in the final product is 10 to 60% by weight. As stated previously, the type of starch used will frequently necessitate some adjustment in solids content since the viscosity of the resulting product in accordance with this invention depends to a large extent, other things being equal, on the starch paste viscosity. Thus, the starch content should be lower when a relatively thick-boiling starch is used.

A test has been devised to compare the sizing properties of the various formulations. In the test the fabric, for example, of polyester fiber such as Dacron, is carefully treated to make sure it contains no sizing. The fabric washed in succession with dilute hydrochloric acid, dilute alkali and, after neutralizing, with a heavy-duty detergent. After rinsing and drying, the fabric is cut into strips ⅝" by 8¼" with the long dimension in the direction of the warp. Each strip is pressed to remove wrinkles.

The fabric is laminated to a film of the essentially same composition; in the case of polyester fiber, such as Dacron, a polyester film is used, such as Mylar. The film is cut into strips 1 inch by 8 inches. In preparing the laminate, one end of a strip of cloth and one end of a strip of film are brought together and clamped with a spring clamp so that at the other end the cloth extends beyond the film by ¼". The clamped strips are immersed for 30 seconds in a 7.5% solids sizing composition at 120° F. During this period all air bubbles are removed by gently stroking with the finger tips. The strips are removed from the size, permitted to drain and gently wiped by pulling the strips between the thumb and forefinger. The laminated strips are then suspended in air maintained at 73° F. and 50% relative humidity and permitted to dry and condition for at least 24 hours.

The force required to separate the film and fabric is determined by means of a tensile strength tester of conventional manufacture, an instrument called the Instron Table Model Tensile Tester. With the free end of the fabric clamped in the non-movable jaw, about one inch of the fabric is pulled from the film. The freed end of the film is then clamped in the movable jaw of the tensile-strength tester. The movable jaw is then moved at a rate of 50 inches per minute until exactly six inches are delaminated by the machine. The force required to pull the strips apart is continuously recorded and an average for each sample is obtained by integrating the area under the curve. Five identical samples are run for each test.

The following examples illustrate the method of this invention and the products produced. These examples are illustrative only. The concentrations are given in percentage and in parts by weight.

Example 1

This example illustrates the basic procedure used in the preparation of the samples. In a resin kettle, a mixture of 22.5 parts dry substance hypochlorite-oxidized starch and 255 parts of distilled water was stirred and heated at the reflux temperature for 30 minutes to paste the starch. The starch paste was then cooled under a blanket of nitrogen to 50° C. During cooling, 0.3 part of ferrous ammonium sulfate, 0.1 part of sodium formaldehyde sulfoxylate and 22.5 parts of ethyl acrylate were added while maintaining the nitrogen atmosphere. The mixture was stirred while 0.45 part of 50% hydrogen peroxide was added. The temperature was maintained at 50° C. for 15.5 hours, producing a stable, creamy aqueous emulsion. There was a 91% conversion of the monomer.

The product was tested for adhesion to Dacron polyester fiber by laminating a strip of fabric with the liquid product (diluted to 7.5% solids) to a Mylar film which is a polyester product almost identical chemically to Dacron fiber, as described before. The measurement on the product of this example indicated that it was markedly better than either the pasted starch alone or poly(ethyl acrylate) emulsion alone. The test value for the product of this example was 6.8 grams while for pasted starch and poly(ethyl acrylate) emulsion the corresponding values were, on an average, 1.1 grams and 3.7 grams. The corresponding value for a physical mixture at the same proportions was only 3.0. A modified starch which is presently used in sizing Dacron fibers was similarly tested, and the delamination force was only 3.0 grams.

Example 2

The procedure of Example 1 was repeated except that the catalyst was changed. In this case, 0.20 part of ammonium persulfate and 0.2 part of sodium bisulfite were used as the catalyst. The product was a fluid, stable emulsion. When tested as a size for Dacron, results similar to those of Example 1 were obtained.

Example 3

Following the procedure of Example 1, 37.5 parts hypochlorite-oxidized starch was reacted with 37.5 parts of ethyl acrylate in 425 parts of water. The adjuvant was 0.05 part ferrous ammonium sulfate and 0.20 part ascorbic acid. The catalyst, 0.40 part of 50% hydrogen peroxide, was withheld until all of the other ingredients had been added. Upon addition of the peroxide, the temperature rose rapidly and the reaction was terminated at the end of 1.1 hours. The product was fluid and uniformly dispersed. It separated on standing, yielding a clear, supernatant liquor, but it was readily re-dispersed. The monomer was completely converted, i.e., no monomer was detectable in the liquid phase. The product was useful as a size for polyester fibers.

The same procedure was followed except that the ascorbic acid was withheld until the peroxide had been added. On addition of the ascorbic acid, the temperature rose rapidly from 52 to 74° C. The reaction was terminated at the end of 0.4 with similar results.

Example 4

The same reaction was performed with 30 parts of an 85% cold-water soluble white dextrin and 70 parts of ethyl acrylate in 100 parts water. The de-lamination test results were that 12.1 grams was the force required. When the ratio was changed to 40 parts dextrin and 60 parts ethyl acrylate, the de-lamination force was 13.6 grams.

Example 5

With essentially the same procedure as in the previous examples, except substituting a white dextrin of 20% cold-water solubility, the reaction proceeded as described before. In this case, equal parts each of the dextrin and ethyl acrylate were used for each sample at a 50% solids content. The reaction time was 2 hours. The results of the de-lamination tests were slightly inferior to those of Example 1.

Example 6

The procedure of Example 1 was followed using butyl acrylate in the place of ethyl acrylate. The de-lamination force was 10.8 grams.

Example 7

Using 50 parts of hypochlorite-oxidized starch and 25 parts each of ethyl acrylate and acrylic acid, an excellent size for polyester fibers was produced with a de-lamination force of 14.4 grams.

Example 8

The procedure of Example 1 was repeated using a 4:1 mixture of ethyl acrylate and methyl methacrylate in the place of ethyl acrylate alone. An emulsion was produced that gives very good results in the sizing test, the de-lamination force being 14.1 grams.

Example 9

A series of samples was prepared with the same active ingredients of Example 1, but the ratio of ethyl acrylate to oxidized starch was varied. The results are indicated in Table 1. In this case the sodium formaldehyde sulfoxylate was omitted.

TABLE 1

| Ratio: Starch to ethyl acrylate— | Delamination force (grams) |
| --- | --- |
| 10/90 | 16.6 |
| 20/80 | 10.7 |
| 30/70 | 24.2 |
| 40/60 | 8.9 |
| 50/50 | 5.1 |

In applying the sizing compound of this invention to yarns before weaving, an aqueous dispersion of about 2 to 20% solids is used. The dispersion is continuously circulated through the size box in which a definite volume is maintained. The fibers are drawn over the rolls through the volume of size in the size box where they become coated with the sizing compound. The fibers are then drawn first through squeeze rolls and then through a drying section in which the fibers are heated sufficiently to dry them. They may be dried by contact with a heated cylinder or by a hot-air blast and are then re-wound.

Since many embodiments of the invention may be made and since many changes may be made in the embodiments described, the foregoing is to be interpreted as illustrative only and the invention is defined in the following claims.

We claim:
1. A yarn-sizing composition comprising a stable aqueous dispersion of a graft copolymer of gelatinized starch obtained by reacting said starch in water, under free-radical polymerization initiating conditions, with the acrylic acid ester of an alkanol of from 2 to 4 carbon atoms in the presence of a free-radical catalyst, the ratio of said starch to said acrylic acid ester being in the range of 6:4 to 1:19 during said reaction.
2. The compound of claim 1 in which the acrylic ester is ethyl acrylate.
3. The compound of claim 1 in which the acrylic ester is butyl acrylate.
4. The composition of claim 1 in which the starch is a thin-boiling, oxidized native starch.
5. A yarn sizing composition comprising a stable aqueous dispersion of a graft copolymer of gelatinized starch obtained by reacting said starch in water, under free-radical polymerization initiating conditions, with the acrylic acid ester of an alkanol of from 2 to 4 carbon atoms and a minor proportion of a second monomer selected from the group consisting of acrylic acid and methyl methacrylate in the presence of a free-radical catalyst, the ratio of starch to the total of acrylic acid ester and second monomer lying in the range of 6:4 to 1:19 during said reaction.

6. In the process of yarn sizing that comprises applying to a yarn an aqueous dispersion of a sizing compound and drying the yarn, the improvement comprising applying, as said sizing compound, a graft copolymer of gelatinized starch obtained by reacting said starch in water, under free-radical polymerization initiating conditions, with the acrylic acid ester of an alkanol of from 2 to 4 carbon atoms in the presence of a free-radical catalyst, the ratio of said starch to said acrylic acid ester being in the range of 6:4 to 1:19 during said reaction.

7. The method of claim 6 in which the fiber is a polyester fiber.

8. A process of sizing yarn prior to weaving into a fabric that comprises drawing said yarn through an aqueous sizing bath containing between 2 and 20% of a sizing compound that consists essentially of the reaction product of gelatinized starch and the acrylic acid ester of an alkanol of 2 to 4 carbon atoms, said reaction product being obtained by a graft polymerization reaction in water between said starch and said acrylic acid ester under free-radical polymerization initiating conditions in the presence of a free-radical catalyst, the ratio of starch to acrylic acid ester lying in the range of 6:4 to 1:19 during said reaction and the total solids content during the reaction lying in the range of 10% to 60% by weight.

9. The process of claim 8 in which the gelatinized starch is a thin-boiling oxidized native starch.

10. The process of claim 8 in which a minor proportion of a second monomer selected from the group consisting of acrylic acid and methyl methacrylate is included in the reaction mixture, the ratio of starch to the total of acrylic acid ester and second monomer lying in the range of 6:4 to 1:19 during the reaction.

11. A yarn having a dry sizing coating comprising the reaction product of gelatinized starch and the acrylic acid ester of alkanol of 2 to 4 carbon atoms, said reaction product being obtained by a graft polymerization reaction in water between said starch and said acrylic acid ester under free-radical polymerization initiating conditions in the presence of a free-radical catalyst, the ratio of starch to acrylic acid ester lying in the range of 6:4 to 1:19 during said reaction and the total solids content during the reaction lying in the range of 10% to 60% by weight.

References Cited in the file of this patent

UNITED STATES PATENTS

| | | |
|---|---|---|
| 2,385,714 | La Piana et al. | Sept. 25, 1945 |
| 2,914,495 | Gordon et al. | Nov. 24, 1959 |
| 2,922,768 | Mino et al. | Jan. 26, 1960 |

FOREIGN PATENTS

| | | |
|---|---|---|
| 462,398 | Canada | Jan. 10, 1950 |
| 703,005 | Great Britain | Jan. 27, 1954 |

OTHER REFERENCES

Kerr: "Chemistry and Industry of Starch," 2nd edition, pub. by Academic Press Inc., New York, 1950, page 165.